US010372349B2

(12) United States Patent
Xu et al.

(10) Patent No.: US 10,372,349 B2
(45) Date of Patent: Aug. 6, 2019

(54) METHOD AND APPARATUS FOR FACILITATING WEAR LEVELING OF SOLID STATE DISK

(71) Applicant: EMC IP HOLDING COMPANY LLC, Hopkinton, MA (US)

(72) Inventors: Xinlei Xu, Beijing (CN); Liam Xiongcheng Li, Beijing (CN); Jian Gao, Beijing (CN); Lifeng Yang, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 15/387,744

(22) Filed: Dec. 22, 2016

(65) Prior Publication Data

US 2017/0192695 A1    Jul. 6, 2017

(30) Foreign Application Priority Data

Dec. 30, 2015    (CN) .......................... 2015 1 1021163

(51) Int. Cl.
*G06F 13/00*    (2006.01)
*G06F 3/06*    (2006.01)
*G06F 12/0802*    (2016.01)

(52) U.S. Cl.
CPC .......... *G06F 3/0616* (2013.01); *G06F 3/0644* (2013.01); *G06F 3/0653* (2013.01); *G06F 3/0673* (2013.01); *G06F 12/0802* (2013.01); *G06F 2212/60* (2013.01)

(58) Field of Classification Search
CPC ....... G06F 2212/217; G06F 2212/7211; G06F 3/06; G06F 12/0802

USPC ......................................................... 711/103
See application file for complete search history.

(56) References Cited

U.S. PATENT DOCUMENTS

| 8,010,738 | B1 | 8/2011 | Chilton et al. |
| 8,046,551 | B1 | 10/2011 | Sahin |
| 8,130,554 | B1 | 3/2012 | Linnell |
| 8,775,723 | B2 * | 7/2014 | Suzuki ............... G06F 12/0246 711/103 |
| 8,880,801 | B1 | 11/2014 | Robins et al. |
| 8,996,951 | B2 * | 3/2015 | Hyde ................. G06F 11/0703 711/103 |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,304,889 | B1 | 4/2016 | Chen et al. |
| 9,342,465 | B1 | 5/2016 | Meiri |

(Continued)

FOREIGN PATENT DOCUMENTS

CN    103731505    4/2014

*Primary Examiner* — Sean D Rossiter
(74) *Attorney, Agent, or Firm* — BainwoodHuang

(57) ABSTRACT

Embodiments of the present disclosure relate to a method and apparatus for facilitating wear leveling of a solid state disk (SSD). The method comprises obtaining a performance parameter of a SSD device of a plurality of SSD devices in the SSD cache, and the SSD device includes one or more SSD disks. The method further comprises determining a weight for the SSD device based on the performance parameter of the SSD device. The method also comprises setting reserved space for the SSD device according to the weight for the SSD device, and the reserved space is inaccessible in the SSD device.

18 Claims, 7 Drawing Sheets

(56) References Cited

U.S. PATENT DOCUMENTS

| | | |
|---|---|---|
| 9,367,398 B1 | 6/2016 | Ben-Moshe et al. |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,442,941 B1 | 9/2016 | Luz et al. |
| 9,606,870 B1 | 3/2017 | Meiri et al. |
| 9,652,352 B1 | 5/2017 | Chilton et al. |
| 9,665,305 B1 | 5/2017 | Natanzon et al. |
| 9,811,288 B1 | 11/2017 | Chen et al. |
| 9,910,791 B1 | 3/2018 | Dibb et al. |
| 9,946,471 B1 | 4/2018 | More et al. |
| 9,996,539 B1 | 6/2018 | Natanzon |
| 10,025,843 B1 | 7/2018 | Meiri et al. |
| 10,042,751 B1 | 8/2018 | Veprinsky et al. |
| 10,055,161 B1 | 8/2018 | Meiri et al. |
| 10,082,965 B1 | 9/2018 | Tamilarasan et al. |
| 2009/0119448 A1* | 5/2009 | Hsu .................. G11C 16/349 711/103 |
| 2013/0013850 A1* | 1/2013 | Baderdinni ......... G06F 12/0868 711/103 |
| 2013/0166614 A1* | 6/2013 | Watanabe ........ G06F 17/30235 707/830 |
| 2014/0136915 A1* | 5/2014 | Hyde .................. G06F 11/0703 714/747 |
| 2014/0156911 A1* | 6/2014 | Alcantara ........... G06F 12/0246 711/103 |
| 2015/0199152 A1 | 7/2015 | Asnaashari |
| 2015/0212755 A1* | 7/2015 | Asnaashari ........... G06F 3/0629 711/103 |
| 2016/0062693 A1* | 3/2016 | Samuels ............... G06F 3/0629 711/103 |
| 2016/0117105 A1* | 4/2016 | Thangaraj ............ G06F 3/0616 711/103 |
| 2017/0329684 A1* | 11/2017 | Lien ..................... G06F 3/0619 |
| 2018/0089095 A1* | 3/2018 | Li ....................... G06F 12/0871 |

\* cited by examiner

METHOD AND APPARATUS FOR FACILITATING WEAR LEVELING OF SOLID STATE DISK

RELATED APPLICATIONS

This application claim priority from Chinese Patent Application Number CN201511021163.9, filed on Dec. 30, 2015 at the State Intellectual Property Office, China, titled "METHOD AND APPARATUS FOR FACILITATING WEAR LEVELING OF SSD" the contents of which is herein incorporated by reference in its entirety.

FIELD

Embodiments of the present disclosure generally relate to storage technology and more specifically relate to a method and apparatus for facilitating wear leveling of a solid state disk (SSD).

BACKGROUND

With the development of storage technology, the solid state disk (SSD) has been widely used. Compared with the traditional hard disk drive (HDD), SSD has advantages such as fast speed and low power consumption. Generally, a HDD storage system uses a SSD with hundreds of GBs or TBs as its cache space to store frequently accessed hot data in order to accelerate data access of HDD storage system.

The lifecycle of the SSD is greatly impacted by writing operation, which is different from HDD. Too many writing operations would render the SSD unreliable. Thus, the number of writing operations that can be performed by a SSD flash disk is limited and varies according to the type of SSD. For example, the number of writing operations that can be performed by multi-level cell (MLC) is only a tenth of that of a single-level cell (SLC), while the number of writing operations that can be performed by a three-level cell (TLC) is only a tenth of that of the MLC. Furthermore, the lifecycle of the SSD is affected by disk temperature and working current of the SSD. When the temperature or working current is high, the wearing extent of SSD will be great, thereby causing more SSD data blocks to break down.

In some cases, some disks will cause serious wearing due to a large number of writing operations such that the overall performance of SSD cache deteriorates, thereby rendering SSD cache instable or inaccessible. The traditional storage system would generally slow down wearing speed of the SSD disk by limiting the frequency of accessing SSD. However, since the frequency of accessing the storage system is reduced, the overall performance of the storage system would also deteriorate correspondingly.

SUMMARY

According to an aspect of the present disclosure, a method for facilitating wear leveling of a solid state disk is provided. The method comprises obtaining a performance parameter of a SSD device of a plurality of SSD devices in the SSD cache, and the SSD device comprises one or more SSD disks. The method further comprises determining a weight for the SSD device based on the performance parameter of the SSD device. The method also includes setting reserved space for the SSD device according to the weight for the SSD device, and the reserved space is inaccessible in the SSD device.

According to another aspect of the present disclosure, an apparatus for facilitating wear leveling of a solid state disk is provided. The apparatus comprises an obtaining unit configured to obtain a performance parameter of a SSD device of a plurality of SSD devices in the SSD cache, and the SSD device comprises one or more SSD disks. The apparatus further comprises a determining unit configured to determine a weight for the SSD device based on the performance parameter of the SSD device. The apparatus also comprises a setting unit configured to set reserved space for the SSD device according to the weight for the SSD device, and the reserved space is inaccessible in the SSD device.

According to another aspect of the present disclosure, an apparatus for facilitating wear leveling of a solid state disk is disclosed. The apparatus comprises a memory and a processor. The processor is configured to obtain a performance parameter of a SSD device of a plurality of SSD devices in a SSD cache, wherein the SSD device comprises one or more SSD disks; to determine a weight for the SSD device based on the performance parameter of the SSD device; and to set reserved space for the SSD device according to the weight for the SSD device, wherein the reserved space is inaccessible in the SSD device.

In the illustrative embodiments of the present disclosure, wear of each of the SSD disks can be leveled, thereby lengthening lifecycle of the SSD disk and enhancing stability of SSD cache effectively.

BRIEF DESCRIPTION OF DRAWINGS

Features, advantages and other aspects of various embodiments of the present disclosure will become more apparent in conjunction with the accompanying drawings with reference to the following detailed depiction, and several embodiments of the present disclosure are illustrated here in an example, but non-limitative, manner, in the accompanying drawings.

DETAILED DESCRIPTIONS

Figure 1:
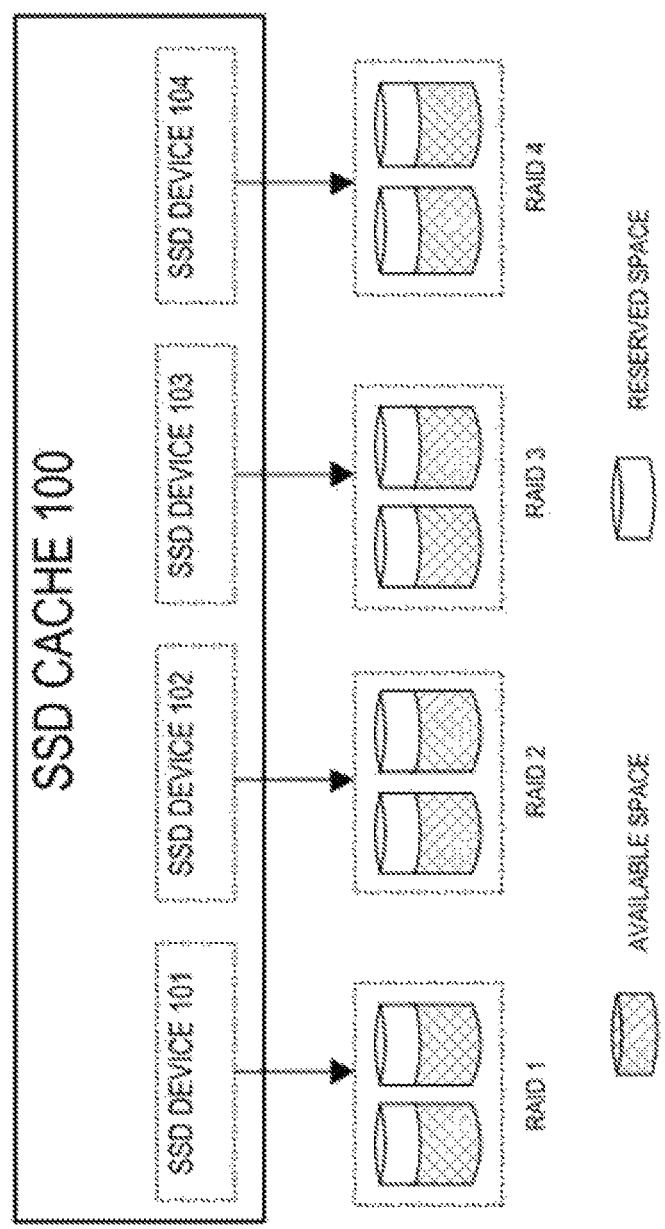
FIG. 1 schematically illustrates a structural diagram of a SSD cache 100 of the prior art.

Various example embodiments of the present disclosure will be described in detail with reference to the accompanying drawings. The flow diagrams and block diagrams in the accompanying drawings illustrate system architecture, functions, and operations which are possibly implemented by the method and system according to various embodiments of the present disclosure. It should be understood that each block in the flow diagrams or block diagrams may represent a unit, a program segment, or a part of code; the unit, program segment, or part of code may include one or more executable instructions for implementing logical functions as prescribed in various embodiments. It should also be noted that in some alternative implementations, the functions indicated in the blocks may also occur in a sequence different from what is indicated in the drawings. For example, two consecutively expressed blocks actually may be executed substantially in parallel, or they sometimes may be executed in a reversed order, dependent on the involved functions. Likewise, it should be noted that each block in the flow diagrams and/or block diagrams, and a combination of blocks in the flow diagrams and/or block diagrams, may be implemented using a specific hardware-based system that performs prescribed functions or operations, or may be implemented using a combination of specific hardware and computer instructions.

The terms "comprise," "include" and similar terms as used herein should be understood as open terms, that is, "comprise/include, but not limited to". The term "based on" refers to "based at least partially on." The term "one embodiment" refers to "at least one embodiment". The term "another embodiment" or "a further embodiment" indicates "at least one further embodiment". Relevant definitions of other terms will be provided in the depiction below.

FIG. 1 schematically illustrates a structural diagram of a example SSD cache 100 of the prior art. As illustrated in FIG. 1, the SSD cache 100 comprises four SSD devices, that is, a SSD device 101, a SSD device 102, a SSD device 103 and a SSD device 104, and each device is comprised of a pair of SSD disks, and the pair of SSD disks form a disk array, such as redundant array of independent disks (RAID).

Generally, a certain reserved space is configured for SSD disk to lengthen the lifecycle of a SSD disk. However, in the conventional design of SSD cache, the ratio between the reserved space and the whole space of SSD disk is fixed. For example, a ratio between the reserved space and the whole space is configured for each SSD disk, and the reserved space is the storage space that cannot be accessed in the SSD disk. As shown in FIG. 1, the storage space can be divided into available space and reserved space for each disk SSD, and the reserved space for each SSD device is the same, for example, 50%.

In some cases, the accessing operation transmitted to SSD device 102 may be a random writing operation, which might cause the temperature and working current of SSD device 102 to increase significantly. If the writing operations are too frequent, the wearing speed of SSD device 102 would be faster than the other three SSD devices, i.e., SSD device 101, 103 and 104. Even more serious is that due to rapid increase of the temperature and working current of the SSD device 102, failure block(s) of SSD device 102 increases significantly. However, a fixed ratio of reserved space in each SSD device in the prior art is configured without taking into consideration of impact of the temperature and the working current on the individual SSD lifecycle.

Figure 2:
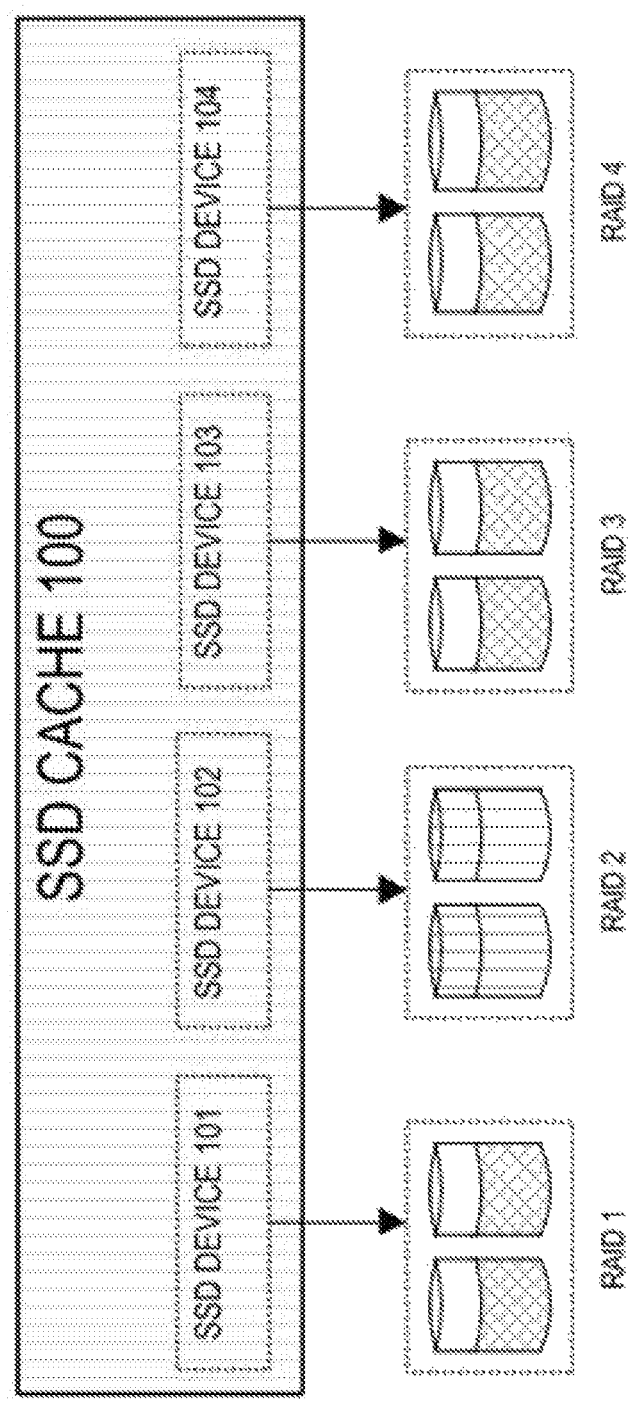
FIG. 2 schematically illustrates an example of failure of the SSD cache 100 of the prior art.

As shown in FIG. 2, at a point of time, the temperature and/or working current of the SSD device 102 is too high, causing the wearing extent of SSD device 102 to increase constantly. When the wearing extent of the SSD device 102 exceeds the security threshold, the SSD device 102 will have a failure or become inaccessible, thereby incurring failure of the whole SSD cache 100. As shown in FIG. 2, the excessively rapid wearing speed of SSD device 102 renders the whole SSD cache 100 unavailable while the wearing ratio of the other three devices remains small. Therefore, the traditional fixed ratio of reserved space severely affects the overall performance of the storage system.

Figure 3:
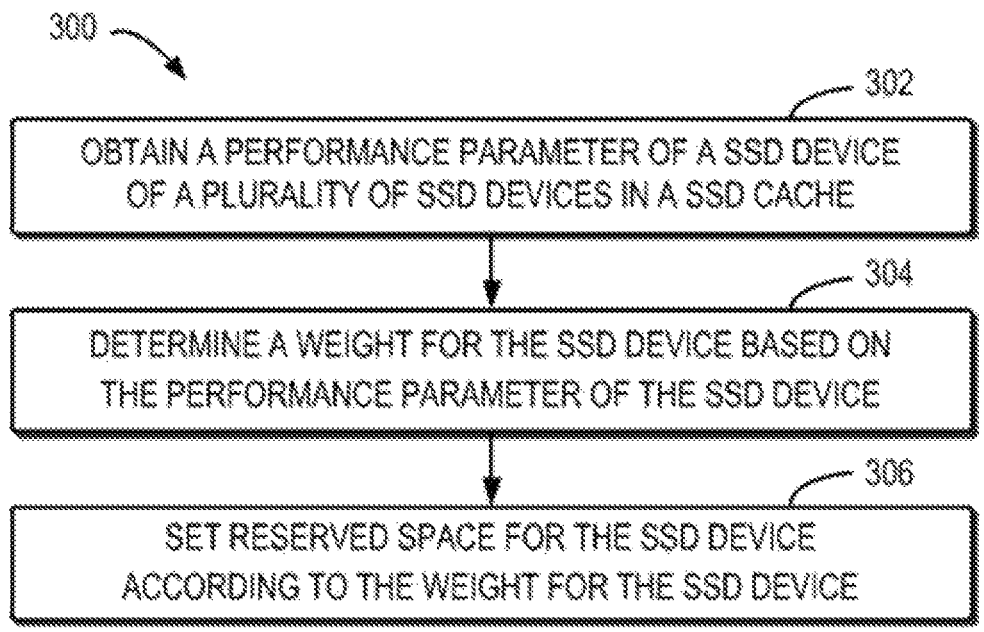
FIG. 3 schematically illustrates a flow diagram of method 300 for facilitating wear leveling of the SSD according to the embodiments of the present disclosure.

FIG. 3 schematically illustrates a flow diagram of method 300 for facilitating wear leveling of the SSD according to the embodiments of the present disclosure. The method 300 comprises obtaining a performance parameter of each of the plurality of SSD devices in the SSD cache at step 302, and each SSD device comprises one or more SSD disks. Optionally, the number of SSD devices can be any value equal to or bigger than 2, for example, 4 or 6. For example, each SSD device may comprise only one SSD disk, that is, each SSD device may be one SSD disk. Alternatively, each SSD device may also comprise a pair of SSD disks to form a RAID.

In some embodiments, a plurality of SSD devices may form SSD cache in a storage system. The storage system may comprise other disk devices (e.g. HDD) as the main storage medium while the SSD may be used as the cache in the HDD storage system. Optionally, SSD cache uses cache page to store frequently accessed hot data in the HDD, and the hot data are random data and can be smaller than for example 64 KB. Alternatively, the magnitude of each cache page may be adjusted according to actual needs.

In some embodiments. the performance parameter of SSD device represents the current working state of the SSD device. The current wearing extent of SSD device may be determined based on the obtained performance parameter of the SSD device. In some embodiments, the performance parameter may be a temperature, a working current or a wearing ratio of SSD device. For instance, the current temperature of a SSD device is 30° C., its current working current is 1A, and its current wearing ratio is 1%. In another embodiment, the performance parameter may be the number of times of writing operations to the SSD device. For instance, the SSD device has been written for 300 times.

In some embodiments, the performance parameter of each of the plurality of SSD devices can be obtained periodically. For example, the temperature and working current of each SSD device are obtained every day or every three hours. Alternatively, a warning condition may be configured, and the operation of obtaining performance parameter of the SSD device is triggered based on the warning condition. For example, when the temperature of a certain SSD device is higher than 40° C. or the working current is greater than 1.2A, the performance parameter of each of the plurality of SSD devices is obtained.

Next, the method 300 proceeds to step 304, a weight for each SSD device is determined based on the performance parameter of the respectively SSD device. For example, the weight for each SSD device is determined based on the temperature, the working current or the wearing ratio of SSD device. The weight for each SSD device may be in direct proportion or in inverse proportion to the value of its performance parameter. For example, the weight for the SSD device n may be represented as $w_n=f(t, I, e)$, wherein t denotes the temperature of the SSD device n, I represents working current of the SSD device n and e denotes the amount of data that has been worn in the SSD device n. When t increases, the value of $w_n$ is increased; and when I increases, the value of $w_n$ is also increased. Generally, the higher SSD disk temperature is, or the bigger the working current is, the more likely that the disk is damaged.

In some embodiments, the weight can be configured so that it increases as the performance parameter increases. Alternatively, the weight can be configured so that it decreases as the performance parameter decreases. That is, the bigger the value of the performance parameter is, the greater the weight for the SSD device is. Optionally, in the preliminary condition, each SSD device has the same temperature, working current and wearing ratio so that the weight value of each SSD device can be equal, for example, set to 1.

Next, at step 306, the reserved space for each SSD device is configured based on the weight for each SSD device. The storage space for each SSD device can be divided into available space and reserved space, and the available space is the storage space that can be accessed in the SSD device, while the reserved space is the inaccessible storage space in the SSD device. The reserved space may be set based on the weight, which can slow the wearing extent of the SSD device with higher wearing extent. For example, the weight for SSD device is $so_n = s*r*f(w_0, w_1, w_2, \ldots, w_n)$, wherein s denotes the whole storage space for SSD device n, r is the ratio of the default reserved space of SSD device n, and $w_n$ is the weight for SSD device n. For example, there are 4 devices, the storage space of each device is 100 GB, and default reserved percentage is 50%, and the initial weight is 1, and thus the initial reserved space for each SSD device is 50 GB. After the SSD device runs for a period of time, since the accessing times of each SSD device is different, each SSD device has different temperatures, working currents and wearing ratios, and thus each SSD device has different weight and reserved space. Table 1 shows the reserved space of the SSD devices at a point of time.

TABLE 1

Example of reserved spaced of SSD devices

| | Temperature | Working current | Wearing ratio | Weight | Reserved space |
|---|---|---|---|---|---|
| SSD device 1 | 30° C. | 1A | 1% | 0.85 | 45G |
| SSD device 2 | 30° C. | 1A | 1% | 0.85 | 45G |
| SSD device 3 | 40° C. | 1.2A | 2% | 1.1 | 50G |
| SSD device 4 | 60° C. | 1.3A | 3% | 1.2 | 60G |

As shown in table 1, the greater the weight for a SSD device is, the larger the reserved space of the SSD device will be. Optionally, for a SSD device with the biggest weight, the reserved space can be configured with the biggest ratio. Alternatively, for SSD device with the smallest weight, the reserved space can be configured with the smallest ratio.

Generally speaking, the accessing frequency of the SSD device is in direct proportion to the available space of the SSD device. Therefore, the accessing times of the SSD device and the reserved space of the SSD device are in inverse proportion. That is, when a specific SSD device is configured with the largest ratio of reserved space, the number of times that the specific SSD device is written is the smallest, and when the specific SSD device is configured with the smallest ratio of reserved space, the number of times that the specific SSD device is written is the largest. Therefore, the reserved space of the SSD device with greater wearing ratio will increase, and its wearing speed will decrease; the reserved space of the SSD device with lower wearing, ratio will decrease, and its wearing speed will increase, so that all the SSD devices in the whole SSD cache will achieve wear leveling.

Figure 4:
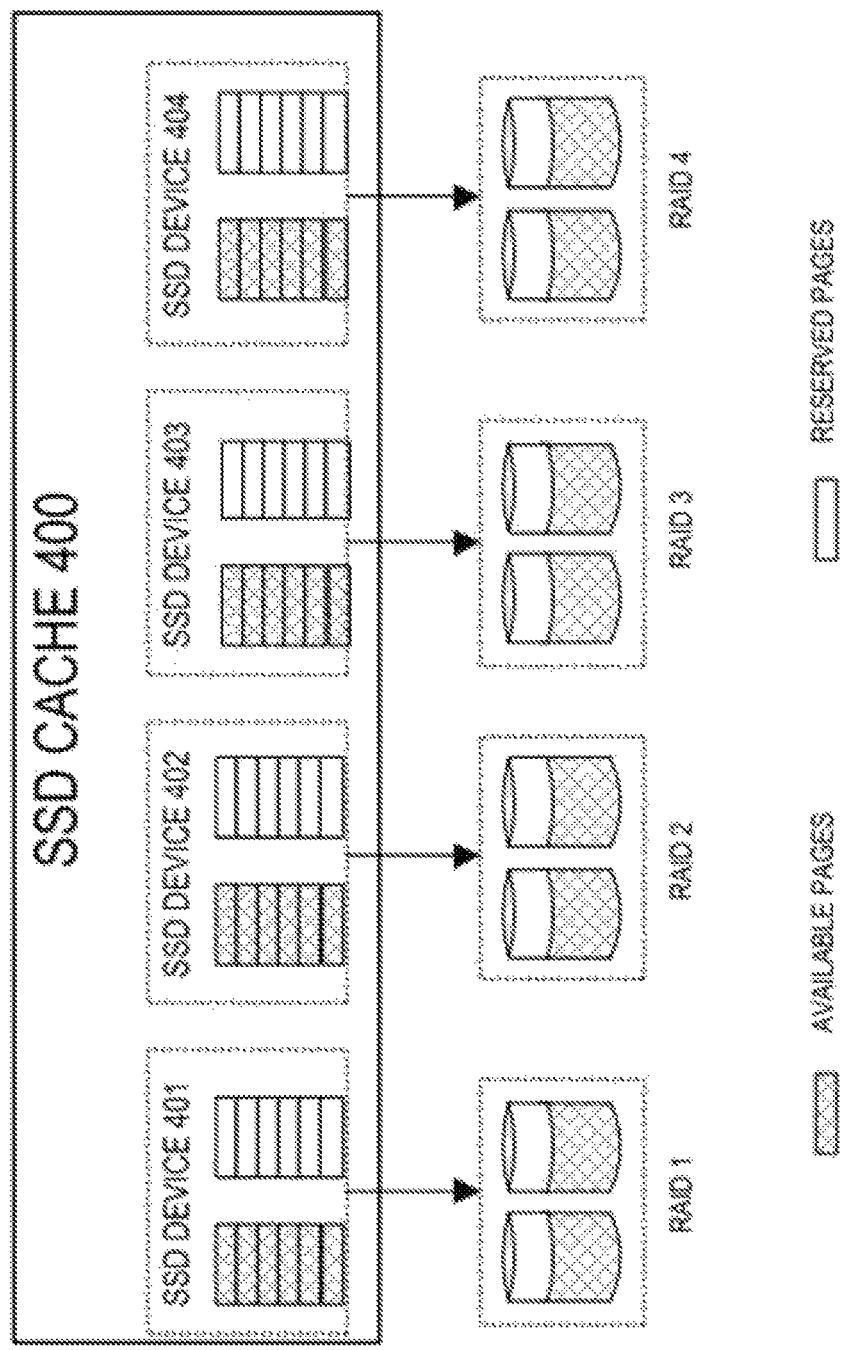
FIG. 4 schematically illustrates a structural diagram of a SSD cache 400 according to an embodiment of the present disclosure.

FIG. 4 schematically illustrates a structural diagram of a SSD cache 400 according to an embodiment of the present disclosure. As shown in FIG. 4, alternatively, the SSD cache 100 comprises four SSD devices, that is, a SSD device 401, a SSD device 402, a SSD device 403 and a SSD device 404, and each SSD device is comprised of a pair of SSD disks forming a RAID. The reserved space is configured in each SSD disk, and the reserved space is the inaccessible storage space in the SSD disk. As shown in FIG. 4, the storage space for each disk SSD can be divided into available space and reserved space. Under the default condition, each SSD device has the same temperature, the same working current and the same wearing ratio. Therefore, the reserved space for each SSD device is the same, for example, 50%.

In some embodiments, the storage space of each SSD device may be 100 GB and comprise a plurality of cache pages. In some embodiments, each cache page may be 64 KB, and 1,620,000 pages exist for each SSD device. Under the default condition, if the default reserved space is 50 GB, then 810,000 available pages and 810,000 reserved pages may exist for each SSD device.

In an embodiment, the weight may be configured for each SSD device. For instance, the weight may be configured so that it increases as the performance parameter increases. Alternatively, the weight can be configured so that it decreases as the performance parameter decreases. That is, the, bigger the value of the performance parameter is, the greater the SSD device weight is. Alternatively, in the default condition, each SSD device has the same temperature, the same working current and the same wearing ratio so that the weight value of each SSD device can be equal, for example, set to 1.

Figure 5:
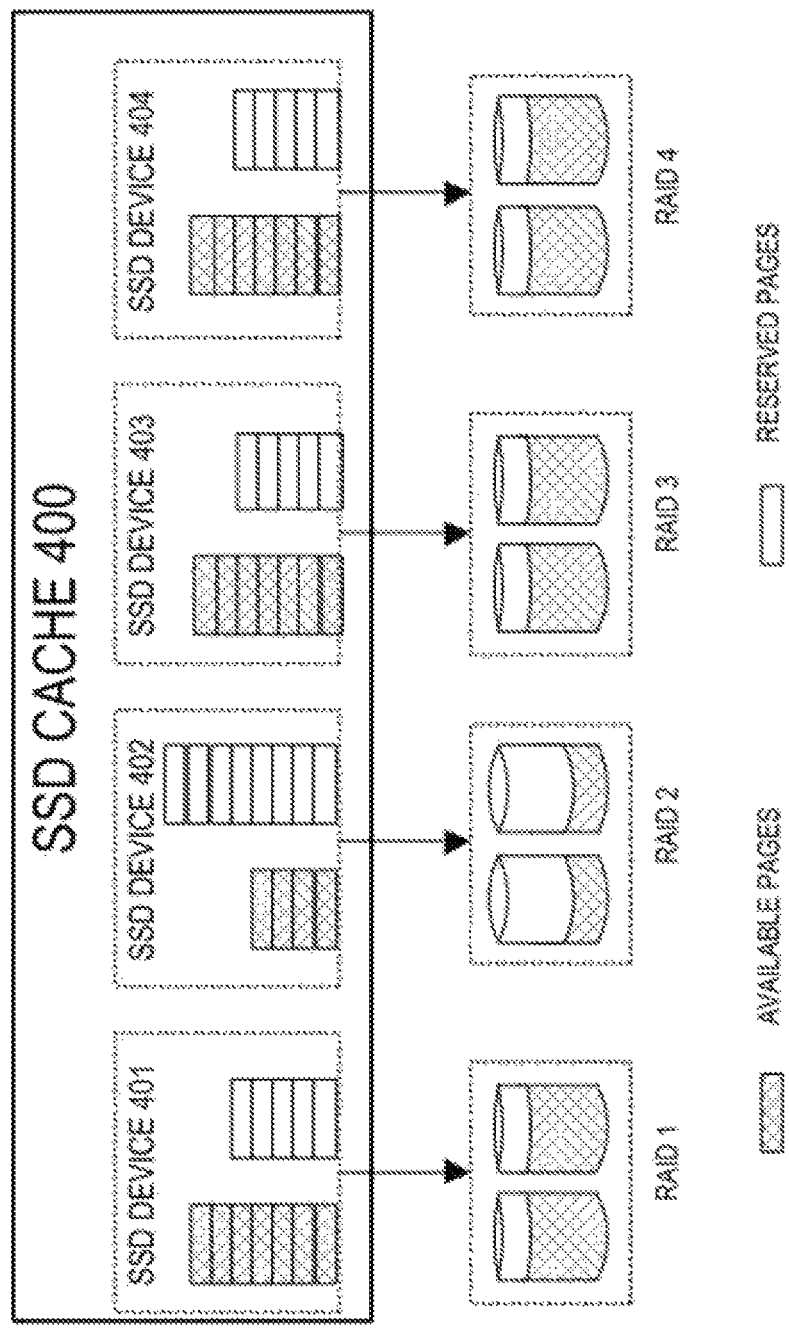
FIG. 5 schematically illustrates an example that the SSD cache 400 dynamically sets reserved space according to an embodiment of the present disclosure.

FIG. 5 schematically illustrates an example that SSD cache 400 dynamically sets reserved space according to an embodiment of the present disclosure. As shown in FIG. 5, after the SSD cache works for a period of time, since the times of writing operations of SSD device 402 is increased, its temperature and working current increase significantly. With the method of wear leveling for SSD according to the embodiments of the present disclosure, the higher the temperature of SSD device 402 is or the bigger the working current of SSD device 402 is, the bigger its weight will be. Correspondingly, the reserved space of the SSD device 402 is increased, for example, the ratio of reserved space for the SSD device 402 is configured as 66.7%. Conversely, since the temperature and working current of SSD device 401, 403 and 404 is lower than those of the SSD device 402, the ratio of its reserved space is configured as 41.7%. After the reserved spaces for the four SSD devices are adjusted dynamically, the SSD cache continues to work.

After the new reserved space for each SSD device is configured, since SSD device 401, 403 and 404 have more available space, writing operations for the three SSD devices will be increased, and their temperature and working current will also increase correspondingly. As to SSD device 402, because it has the smallest available space, its writing operations will decrease significantly. Therefore, after a period of time, the weight for SSD device 402 will decrease while the weights for SSD device 401, 403 and 404 will increase. Correspondingly, the reserved space of SSD device 402 is decreased, the reserved spaces of SSD device 401, 403 and 404 are increased, and the state of each SSD device in the SSD cache returns to the default condition shown in FIG. 4 so that the wearing condition of each SSD device is dynamically leveled. Consequently, for the SSD device 402, temporary increment of temperature or working current will not affect its lifecycle. With the method 300 for facilitating wear leveling for the SSD according to the embodiments of the present disclosure, wearing between SSD devices in the SSD cache may be leveled. Therefore, the overall performance of the SSD cache can be effectively improved with the embodiments of the present disclosure.

Figure 6:
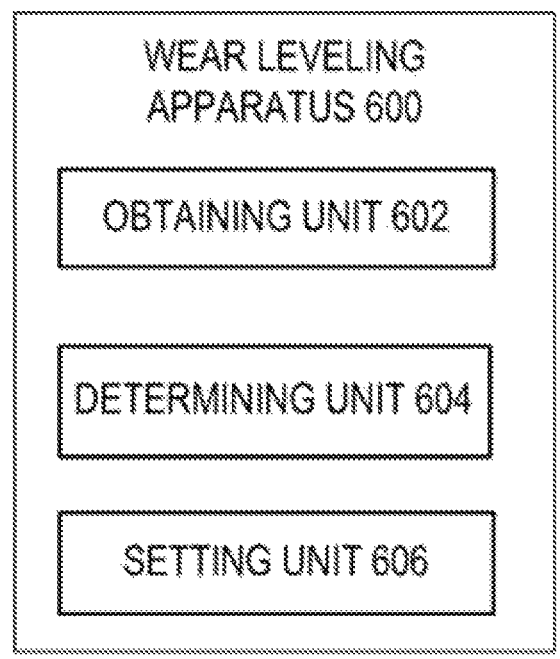
FIG. 6 schematically illustrates a block diagram of apparatus 600 for wear leveling of the SSD according to the embodiments of the present disclosure.

FIG. 6 schematically illustrates a block diagram of apparatus 600 for facilitating wear leveling of the SSD according to the embodiments of the present disclosure. The apparatus 600 comprises an obtaining unit 602 configured to obtain a performance parameter of a SSD device of a plurality of SSD devices in a SSD cache, and the SSD device comprises one or more SSD disks. The apparatus 600 further comprises a determining unit 604 configured to determine a weight for the SSD device based on the performance parameter of the SSD device. Moreover, the apparatus 600 also comprises a setting unit 606 configured to set reserved space for the SSD device according to the weight for the SSD device, and the reserved space is inaccessible in the. SSD device.

In some embodiments, the SSD cache uses cache page(s) to store hot data frequently accessed in a hard disk drive (HDD). Alternatively, the hot data is random data and its size may be smaller than 64 KB.

In some embodiments, the performance parameter may comprise at least one of the following: a temperature, a working current and a wearing ratio. Optionally, the obtaining unit 602 may be further configured to r obtain the performance parameter of the SSD device periodically. In another embodiment, the determining unit 604 is configured to set the weight for the SSD device so that the weight increases as the performance parameter increases; and/or configuring the weight for the SSD device so that the weight decreases as the performance parameter decreases. Alternatively, the default weight for each SSD device is the same.

In some embodiments, the setting unit 606 may be further configured to set the reserved space greater than threshold space in response to the weight being above a predetermined threshold; and/or setting the reserved space less than threshold space in response to the weight being below the predetermined threshold. For example, the setting unit 606 may be configured to set the biggest ratio of reserved space for SSD device having the biggest weight; and/or set the smallest ratio of reserved space for SSD device having the smallest weight. In some embodiments, when a specific SSD device is configured with the reserved space with the biggest ratio, the number of times that the specific SSD device is written is the smallest; and/or when the specific SSD device is configured with a reserved space with the smallest ratio, the number of times that the specific SSD device is written is the largest.

Figure 7:
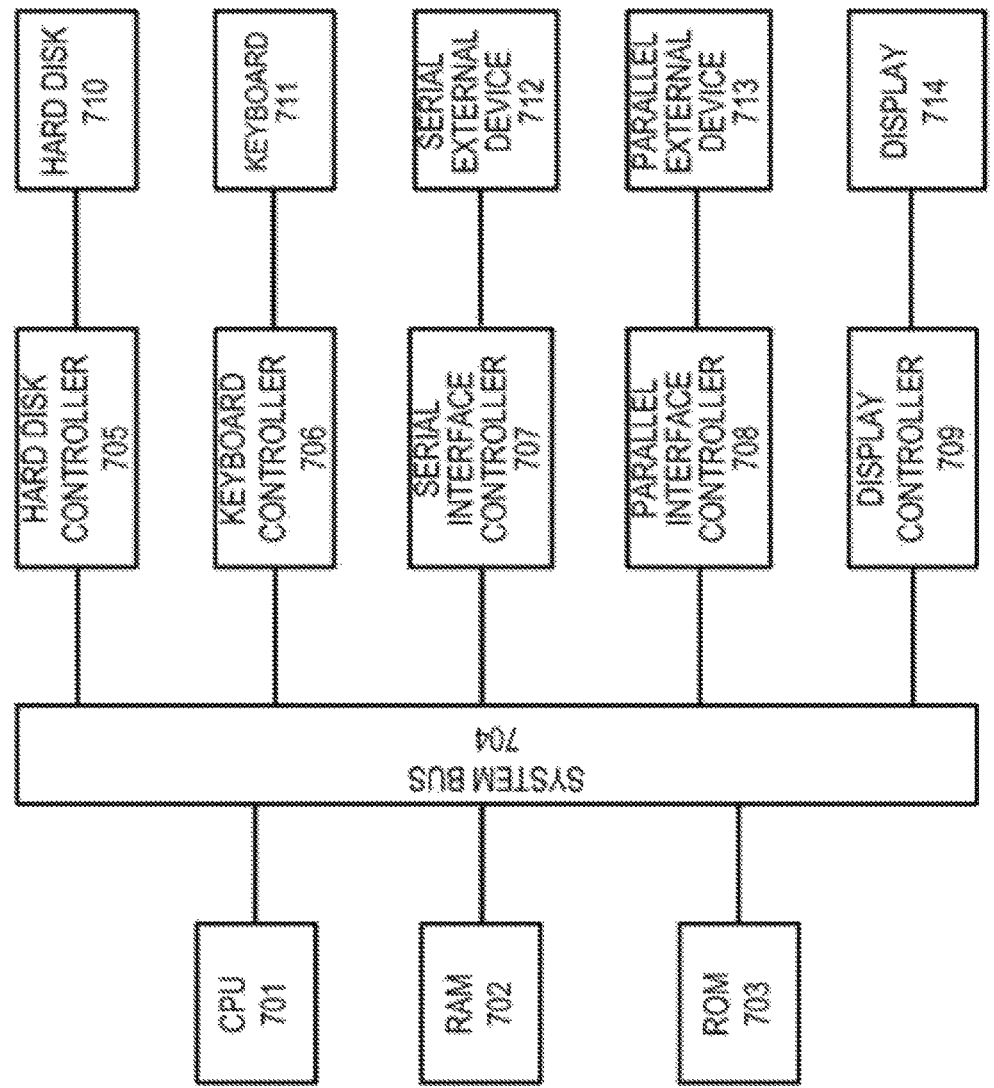
FIG. 7 schematically illustrates a block diagram of a computer device 700 in which embodiments of the present disclosure may be implemented.

Hereinafter, a computer device in which embodiments of the present disclosure may be implemented will be described with reference to FIG. 7. FIG. 7 schematically illustrates a block diagram of a computer device 700 in which embodiments of the present disclosure may be implemented.

The computer device as shown in FIG. 7 comprises a central processing unit (CPU) 701, a random access memory (RAM) 702, a read only memory (ROM) 701 a system bus 704, a hard disk controller 705, a keyboard controller 706, a serial interface controller 707, a parallel interface controller 708, a display controller 709, a hard disk 710, a keyboard 711, a serial external device 712, a parallel external device 713 and a display 714. In these devices, what are coupled to the system bus 704 include the CPU 701, the RAM 702, the ROM 703, the hard disk controller 705, the keyboard controller 706, the serial interface controller 707, the parallel interface controller 708, and the display controller 709. The hard disk 710 is coupled to the hard disk controller 705, the keyboard 711 is coupled to the keyboard controller 706, the serial external device 712 is coupled to the serial interface controller 707, the parallel external device 713 is coupled to the parallel interface controller 708, and the display 714 is coupled to the display controller 709. It should be understood that the structural block diagram as shown in FIG. 7 is only illustrated for example purposes, and not for limiting the scope of the present invention. In some cases, some devices may be added or reduced according to the needs. Embodiments of the present disclosure may be stored as computer program codes in a storage device such as the hard disk 710 on the computer. The computer program codes, when loaded into for example an memory to run, cause the CPU 701 to perform the method for facilitating weal leveling for the SSD according to embodiments of the present disclosure.

The present descriptions above are only optional embodiments, not intended to limit the present disclosure. To those skilled in the art, embodiments of the present disclosure may have various modifications and variations. Any modifications, equivalent replacements, and improvements within the spirit and principle of embodiments of the present disclosure should be included within the protection scope of embodiments of the present disclosure.

What is claimed is:

1. A method for facilitating wear leveling for a solid state disk (SSD), comprising:
    obtaining a performance parameter of a SSD device of a plurality of SSD devices in a SSD cache, the SSD device including one or more SSD disks, wherein the performance parameter is enabled to comprise temperature of the SSD device;
    determining a weight for the SSD device based on the performance parameter of the SSD device; and
    setting reserved space for the SSD device according to the weight for the SSD device, the reserved space being inaccessible in the SSD device;
wherein setting the reserved space for the SSD device according to the weight for the SSD device comprises at least one of the following:
    setting the reserved space greater than a threshold space in response to the weight being above a predetermined threshold, and
    setting the reserved space less than the threshold space in response to the weight being below the predetermined threshold; and
wherein
    if the reserved space is set to be greater than the threshold space, a writing frequency of the SSD device is set to be less than a threshold frequency, and
    if the reserved space is set to be less than the threshold space, the writing frequency of the SSD device is set to be greater than the threshold frequency.

2. The method according to claim 1, wherein the SSD cache uses a cache page to store hot data frequently accessed in a hard disk drive (HDD).

3. The method according to claim 2, wherein the hot data is random data with a size below 64 KB.

4. The method according to claim 1, wherein the obtaining a performance parameter of a SSD device of a plurality of SSD devices in a SSD cache comprises:
    periodically obtaining the performance parameter of the SSD device.

5. The method according to claim 4, wherein the determining a weight for the SSD device based on the performance parameter of the SSD device comprises at least one of the following:
    configuring analysis of the weight for the SSD device so that the weight increases as the performance parameter increases; and configuring analysis of the weight for the SSD device so that the weight decreases as the performance parameter decreases.

6. The method according to claim 5, wherein the plurality of SSD devices has a same default weight.

7. The method according to claim 1, wherein the performance parameter further includes at least one of a working current and a wearing ratio.

8. The method according to claim 1, wherein the performance parameter of the SSD device is obtained periodically in response to expiration of a predefined time period; and
wherein the method further comprises:
detecting that the temperature of another SSD device of the plurality of SSD devices is higher than a predefined temperature threshold, and
in response to detecting that the temperature of the other SSD device is higher than the predefined temperature threshold, obtaining the performance parameter of each SSD of the plurality of SSD devices.

9. An apparatus for facilitating wear leveling for a solid state disk (SSD), comprising:
an obtaining unit configured to obtain a performance parameter of a SSD device of a plurality of SSD devices in a SSD cache, the SSD device including one or more SSD disks, wherein the performance parameter is enabled to comprise temperature of the SSD device;
a determining unit configured to determine a weight for the SSD device based on the performance parameter of the SSD device; and
a setting unit configured to set reserved space for the SSD device according to the weight for the SSD device, the reserved space being inaccessible in the SSD device;
wherein the setting unit is configured to perform at least one of the following:
setting the reserved space greater than a threshold space in response to the weight being above a predetermined threshold, and
setting the reserved space less than the threshold space in response to the weight being below the predetermined threshold, and
wherein
if the reserved space is set to be greater than the threshold space, a writing frequency of the SSD device is set to be less than a threshold frequency, and
if the reserved space is set to be less than the threshold space, the writing frequency of the SSD device is set to be greater than the threshold frequency.

10. The apparatus according to claim 9, wherein the SSD cache uses a cache page to store hot data frequently accessed in a hard disk drive (HDD).

11. The apparatus according to claim 10, wherein the hot data is random data with a size below 64 KB.

12. The apparatus according to claim 9, wherein the obtaining apparatus is further configured to:
periodically obtain the performance parameter of the SSD device.

13. The apparatus according to claim 12, wherein the determining apparatus is configured to perform at least one of the following:
configuring the weight for the SSD device so that the weight increases as the performance parameter increases; and
configuring the weight for the SSD device so that the weight decreases as the performance parameter decreases.

14. The apparatus according to claim 13, wherein the plurality of SSD devices has a same default weight.

15. The apparatus according to claim 9, wherein the performance parameter further includes at least one of a working current and a wearing ratio.

16. The apparatus according to claim 9, wherein the obtaining unit obtains the performance parameter of the SSD device periodically in response to expiration of a predefined time period; and
wherein the obtaining unit is further configured to:
detect that the temperature of another SSD device of the plurality of SSD devices is higher than a predefined temperature threshold, and
in response to detecting that the temperature of the other SSD device is higher than the predefined temperature threshold, obtain the performance parameter of each SSD of the plurality of SSD devices.

17. The apparatus according to claim 9, wherein the processor obtains the performance parameter of the SSD device periodically in response to expiration of a predefined time period; and
wherein the processor is further configured to:
detect that the temperature of another SSD device of the plurality of SSD devices is higher than a predefined temperature threshold, and
in response to detecting that the temperature of the other SSD device is higher than the predefined temperature threshold, obtain the performance parameter of each SSD of the plurality of SSD devices.

18. An apparatus for facilitating wear leveling of a solid state disk SSD, comprising:
a memory; and
a processor configured to:
obtain a performance parameter of a SSD device of a plurality of SSD devices in a SSD cache, the SSD device including one or more SSD disks, wherein the performance parameter is enabled to comprise temperature of the SSD device;
determine a weight for the SSD device based on the performance parameter of the SSD device; and
set reserved space for the SSD device according to the weight for the SSD device, the reserved space being inaccessible in the SSD device;
wherein the processor, when setting the reserved space for the SSD device according to the weight for the SSD device, is constructed and arranged to perform at least one of the following:
set the reserved space greater than a threshold space in response to the weight being above a predetermined threshold, and
set the reserved space less than the threshold space in response to the weight being below the predetermined threshold; and
wherein
if the reserved space is set to be greater than the threshold space, a writing frequency of the SSD device is set to be less than a threshold frequency, and
if the reserved space is set to be less than the threshold space, the writing frequency of the SSD device is set to be greater than the threshold frequency.

* * * * *